United States Patent
Drexler (10) Patent No.: US 11,703,318 B1
(45) Date of Patent: Jul. 18, 2023

(54) HOMODYNE ENCODER SYSTEM WITH ADAPTIVE PATH LENGTH MATCHING

(71) Applicant: The United States of America, as represented by the Secretary of the Navy, San Diego, CA (US)

(72) Inventor: Kyle Robert Drexler, San Diego, CA (US)

(73) Assignee: United States of America as represented by the Secretary of the Navy, Washington, DC (US)

( * ) Notice: Subject to any disclaimer, the term of this patent is extended or adjusted under 35 U.S.C. 154(b) by 37 days.

(21) Appl. No.: 17/679,423

(22) Filed: Feb. 24, 2022

(51) Int. Cl.
*G01B 9/02056* (2022.01)
*G01B 9/02* (2022.01)
*G01B 9/0209* (2022.01)

(52) U.S. Cl.
CPC ....... *G01B 9/02057* (2013.01); *G01B 9/0209* (2013.01); *G01B 9/02084* (2013.01)

(58) Field of Classification Search
CPC ............ G01B 9/02057; G01B 9/02084; G01B 9/0209
See application file for complete search history.

(56) References Cited

U.S. PATENT DOCUMENTS

2018/0249100 A1   8/2018   Watson

FOREIGN PATENT DOCUMENTS

| WO | WO-2010007251 A1 * | 1/2010 | ......... G02B 19/0014 |
| WO | WO-2021229575 A1 * | 11/2021 | |

OTHER PUBLICATIONS

Drexler, Kyle et al. "Digital adaptive optics for turbulence mitigation". Proc. SPIE 11834, Laser Communication and Propagation through the Atmosphere and Oceans X, 118340D, Aug. 4, 2021. (Year: 2021).*
K. Drexler and K. Watson, "Digital Adaptive Optics," in Imaging and Applied Optics 2017, OSA Technical Digest, paper CM2B.4 2017.

* cited by examiner

*Primary Examiner* — Michael A Lyons
(74) *Attorney, Agent, or Firm* — Naval Information Warfare Center Pacific; Kyle Eppele; James R. McGee (57) ABSTRACT

A homodyne encoder system has adaptive matching of path lengths. Primary apertures receive light from a target. An optical spreader spreads apart the light passing through the primary apertures by at least a factor of two times a baseline separation of the primary apertures. The optical spreader includes a plurality of actuators for modifying the path lengths within the homodyne encoder system through the primary apertures to a detector. A focusing optic focuses the light from the optical spreader at the detector. The detector detects an image of the target with the light from the focusing optic.

20 Claims, 5 Drawing Sheets

HOMODYNE ENCODER SYSTEM WITH ADAPTIVE PATH LENGTH MATCHING

FEDERALLY-SPONSORED RESEARCH AND DEVELOPMENT

The United States Government has ownership rights in this invention. Licensing and technical inquiries may be directed to the Office of Research and Technical Applications, Naval Information Warfare Center Pacific, Code 72120, San Diego, Calif., 92152; voice (619) 553-5118; ssc_pac_t2@navy.mil. Reference Navy Case Number 111316.

BACKGROUND OF THE INVENTION

Light propagating through the Earth's atmosphere encounters atmospheric turbulence, which causes dynamic temperature and pressure fluctuations, and these fluctuations randomly vary the index of refraction throughout the Earth's atmosphere. Thus, light propagating through the Earth's atmosphere collects wavefront errors that degrade imaging through the atmospheric turbulence. The classic example is a star in the sky that has a steady brightness when observed from outer space, but appears to twinkle when viewed at the Earth's surface. Thus, an Earth-bound astronomical telescope is usually placed on a high mountaintop to put the astronomical telescope above most of the Earth's atmosphere and its atmospheric turbulence.

Active imaging systems use a LASER to illuminate an object. Interferometry techniques deduce the effects of the atmospheric turbulence from the returning LASER light reflected and scattered from the object or the intervening atmosphere, and the deduced effects of the atmospheric turbulence are used to enhance the image of the object. However, the required LASER increases the size, weight, and power of the active imaging system. There is a general need for imaging systems with reduced size, weight, and power that provide enhanced imaging through atmospheric turbulence.

SUMMARY

A homodyne encoder system has adaptive matching of path lengths. Primary apertures receive light from a target. An optical spreader spreads apart the light passing through the primary apertures by at least a factor of two times a baseline separation of the primary apertures. The optical spreader includes a plurality of actuators for modifying the path lengths within the homodyne encoder system through the primary apertures to a detector. A focusing optic focuses the light from the optical spreader at the detector. The detector detects an image of the target with the light from the focusing optic.

BRIEF DESCRIPTION OF THE DRAWINGS

Throughout the several views, like elements are referenced using like references. The elements in the figures are not drawn to scale and some dimensions are exaggerated for clarity.

DETAILED DESCRIPTION OF EMBODIMENTS

The disclosed systems and methods below may be described generally, as well as in terms of specific examples and/or specific embodiments. For instances where references are made to detailed examples and/or embodiments, it should be appreciated that any of the underlying principles described are not to be limited to a single embodiment, but may be expanded for use with any of the other methods and systems described herein as will be understood by one of ordinary skill in the art unless otherwise stated specifically.

Embodiments of the invention provide enhanced imaging through atmospheric turbulence without needing LASER illumination. This reduces the size, weight, and power of the imaging system, and enables imaging of objects that cannot or should not be illuminated with a LASER. Like active imaging systems with an illuminating LASER, certain disclosed embodiments of the invention use interferometry techniques to deduce the effects of the atmospheric turbulence. However, self-referencing interferometry is used instead of LASER illumination interferometry.

Self-referencing interferometry receives light from an object under ambient illumination at multiple apertures and then superimposes the light received from each of the apertures. Because the light received from the object is generally incoherent light, the light received from the object has a short coherence length of typically a few wavelengths even when restricted to a narrow bandwidth. This short coherence length compels incredibly difficult and exacting calibration, but even when successfully calibrated to the required tight tolerance of a few wavelengths of light, subsequent thermal cycling and other environmental conditions often cause optical alignment drift that degrades the calibration, further compelling frequent recalibration.

Embodiments of the invention provide a homodyne encoder system with in-situ adaptive matching of path lengths for fast and efficient initial calibration and, as needed, recalibration. The system is a homodyne system because light from a target is interfered with itself using multiple apertures. The system is an encoder system because the distortion caused by the propagation medium is encoded in the detected image, and this encoding enables calculations that recover the distortion from the detected image. With the distortion then known, the detected image is enhanced by removing the distortion caused by the propagation medium.

A calibration cycle uses a known light source disposed nearby to ensure an absence of atmospheric distortion between the light source and the homodyne encoder system. Typically, the light source is an incoherent light source of small spatial extent, such as a point light source; however, the light source can be any known light source. The homodyne encoder system determines any distortion present when imaging the known light using the same interference techniques as normal imaging. Because any distortion present is not atmospheric distortion, it is instrument distortion caused within the homodyne encoder system. Actuators appropriately move components within the homodyne encoder system to neutralize the instrument distortion. After calibration, normal imaging images external targets, and the distortion detected during normal operation is atmospheric distortion because the instrument distortion is already neutralized, unless optical alignment drift or other environmental conditions have reintroduced some instrument distortion. When instrument distortion becomes reintroduced, the calibration cycle is repeated to neutralize the instrument distortion again.

Figure 1:
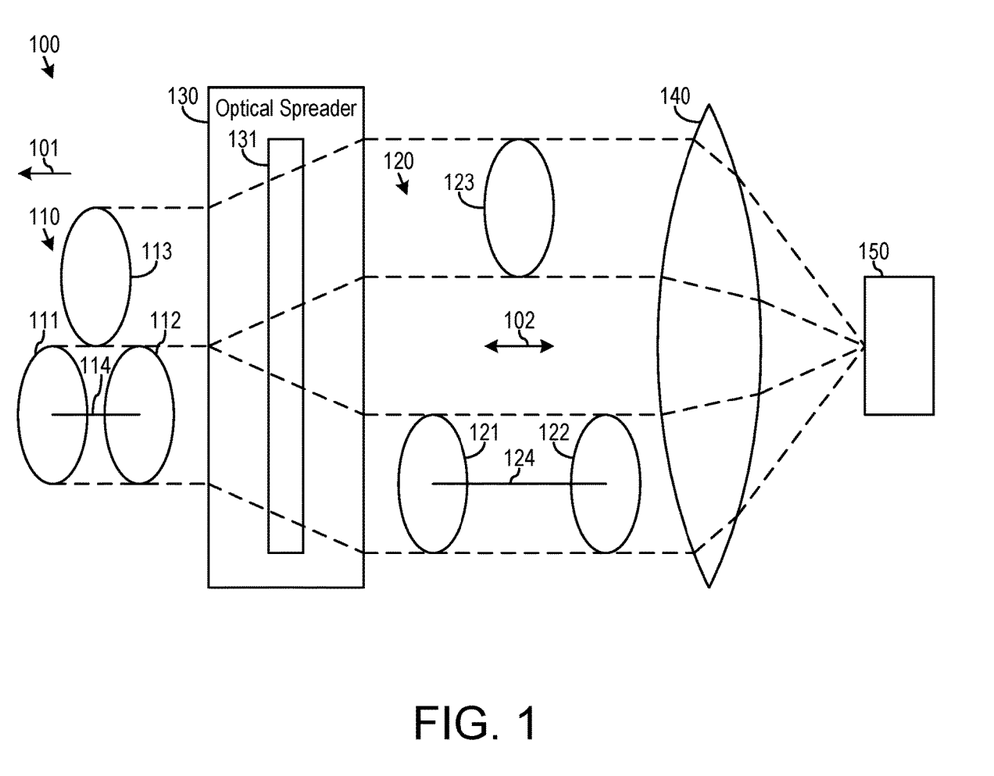
FIG. 1 is a block diagram of a homodyne encoder system with adaptive matching of path lengths in accordance with an embodiment of the invention.

FIG. 1 is a block diagram of a homodyne encoder system 100 with adaptive matching of path lengths in accordance with an embodiment of the invention. The homodyne encoder system 100 images a target, which is typically far away in direction 101, while encoding spatial frequencies that enable quantifying the atmospheric distortion between the target in direction 101 and the homodyne encoder system 100, and also enable compensating for this atmospheric distortion to enhance the image of the target.

The homodyne encoder system 100 includes primary apertures 110 for receiving light from the target. This embodiment shows three primary apertures 111, 112, and 113. Three primary apertures 111, 112, and 113 is a typical minimum number of apertures because this enables quantifying and counteracting the piston, tip, and tilt induced from the atmospheric distortion. Embodiments with more apertures quantify and counteract higher modes of atmospheric distortion.

An optical spreader 130 spreads apart the light passing through the primary apertures 110 by at least a factor of two times a baseline separation 114 of the primary apertures 110. Thus, the baseline separation 124 of the secondary apertures 120 is at least a factor of two times a baseline separation 114 of the primary apertures 110. If the primary apertures 110 are circular and abut without much space between them, then the baseline separation 114 equals the diameter of each of the primary apertures 110, and baseline separation 124 of the secondary apertures 120 is at least twice the diameter of the primary apertures 110.

In this embodiment with the three primary apertures 111, 112, and 113 shown in a perspective view in FIG. 1, primary aperture 111 is spread radially away from symmetry axis 102 to yield secondary aperture 121, primary aperture 112 is spread radially away from symmetry axis 102 to yield secondary aperture 122, and primary aperture 113 is spread radially away from symmetry axis 102 to yield secondary aperture 123. In general and regardless of the number of primary apertures 110, the spreading includes both radial and circumferential components that arrange the secondary apertures 120 in a non-redundant array. For the three primary apertures 111, 112, and 113, non-redundant means the centers of the three secondary apertures 121, 122, and 123 are not collinear. Typically, the non-redundant array of the secondary apertures 120 is arranged as far as possible from any redundancy, which is achieved for the three secondary apertures 121, 122, and 123 when their centers are arranged at the vertices of an equilateral triangle.

The focusing optic 140, such as a lens, focuses the light from the optical spreader 130 at the detector 150. The focusing optic 140 generates an image of the target at the detector 150, and the image at the detector 150 is a Fourier transform of the light passing through the secondary apertures 120, especially when the target is far away in direction 101. The detector 150 detects the image of the target with the light from the focusing optic 140.

If the optical spreader 130 is omitted so there are no secondary apertures 120, then the focusing optic 140 would generate an image of the target at the detector 150, and each of the primary apertures 110 would contribute their respective modulation transfer function (MTF) to the image at the detector 150. Because the MTF of each of the primary apertures 110 includes spatial frequency components with corresponding information relating to twice the diameter of the primary apertures 110, but the baseline separation 114 of the primary apertures 110 is only the diameter of the primary apertures 110, the MTF of the primary apertures 110 would overlap at the detector 150. Therefore, the contribution of each of the primary apertures 110 cannot be determined from the image of the target at the detector 150 if the optical spreader 130 is omitted.

In contrast, because the optical spreader 130 is included and spreads apart the light passing through the primary apertures 110 by at least a factor of two times the baseline separation 114 into a non-redundant array of the secondary apertures 120, the MTF of the secondary apertures 120 do not overlap at the detector 150. Therefore, the contribution of each of the primary apertures 110 can be determined from the image of the target at the detector 150 because the optical spreader 130 is included.

The light passing through a pairing of primary apertures 111 and 112 produces a respective interference pattern superimposed on the image of the target at detector 150. The respective interference pattern for the pairing of primary apertures 111 and 112 includes fringes nominally running roughly perpendicular to the baseline separation 124 of the secondary apertures 121 and 122. The other pairings of primary apertures 111 and 113 and of primary apertures 112 and 113 similarly produce respective interference patterns. Thus, the image of the target at detector 150 is an image of the target with superimposed and interleaved fringes of respective interference patterns. Because the optical spreader 130 spreads apart the light passing through the primary apertures 110 by at least the factor of two, for every pairing of two of the primary apertures 110, the respective interference pattern for the pairing has distinct spatial frequencies, and hence separable spatial frequencies. The respective interference patterns for the pairings of the primary apertures 110 occur even when the light received from the target is incoherent light.

However, the interference patterns occur only when the path lengths are matched within the homodyne encoder system 100. An imaged bandwidth at the detector 150 is typically 3% to 10% of the imaged wavelength, and this puts an upper bound on the coherence length at 30 to 10 wavelengths, unless the target emits monochromatic light within the bandwidth. However, a more typical coherence length is three wavelengths of light. Thus, the interference patterns occur only when the path lengths are matched within a few wavelengths of light. Meticulous alignment could equalize path lengths under static environmental conditions, but instead embodiments of the invention include actuators 131, which during automatically repeated calibration cycles match the path lengths despite dynamically varying environmental conditions. With matched path lengths, the resulting interference patterns enable quantifying and counteracting the atmospheric distortion. Thus, embodiments of the invention include actuators 131 for modifying and matching the path lengths within the homodyne encoder system 100 through the primary apertures 110 to the detector 150.

The path lengths are matched when, for every pairing of two of the primary apertures 110 and in an absence of atmospheric distortion between the target and the homodyne encoder system 100, the light passing through the pairing of the primary apertures 110 has optically equal path lengths from a respective point of the target to a corresponding point in the image of the target at the detector 150, with the respective point for the pairing of the primary apertures 110 imaged into the corresponding point in the image. Note that with atmospheric distortion optically equal path lengths does not imply path lengths spanning equal distances because, for example, the average index of refraction from the target to primary aperture 111 may differ from the average index of refraction from the target to primary aperture 112. This describes a piston distortion, which is detected and corrected in embodiments of the invention.

In the specific embodiment of FIG. 1, the homodyne encoder system 100 includes three circular apertures 110 surrounding a symmetry axis 102 through the homodyne encoder system 100. The optical spreader 130 transposes the light passing through each of the three circular apertures 110 radially away from the symmetry axis 102 by at least the factor of two times the baseline separation 114. The baseline separation 114 equals a diameter of each of the three circular apertures 110. The optical spreader 130 transposes the light into a non-redundant array of secondary apertures 120. Actuators 131 modify the path lengths within the homodyne encoder system 100 through the primary apertures 110 to the detector 150. Example actuators 131 include liquid crystal layers inserting a variable phase delay along the path lengths within the homodyne encoder system 100, piezoelectric transducers driving reflective diffractive optical elements, and piezoelectric transducers driving folding mirrors along the path lengths within the homodyne encoder system 100. The focusing optic 140 is a lens for focusing the light from the optical spreader 130 and the secondary apertures 120 at the detector 150. The detector 150 is a pixelated detector for detecting the image, which is a two-dimensional image of the target, with the light from the lens.

Figure 2:
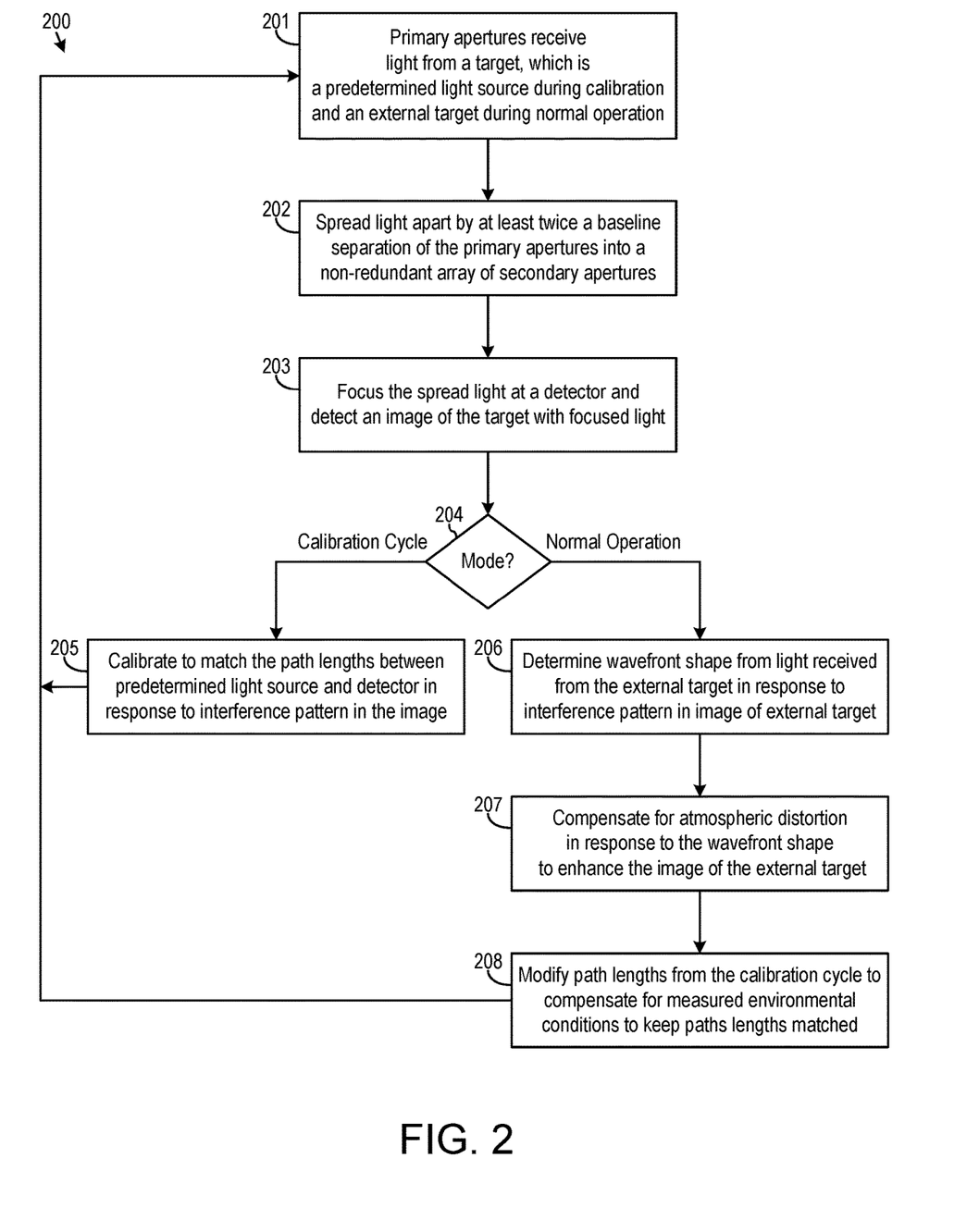
FIG. 2 is a flow diagram of process for adaptive matching of path lengths within a homodyne encoder system in accordance with an embodiment of the invention.

FIG. 2 is a flow diagram of process 200 for adaptive matching of path lengths within a homodyne encoder system in accordance with an embodiment of the invention.

At step 201, light from a target is received at primary apertures of the homodyne encoder system. The target is a predetermined light source during a calibration cycle and is an external target during a normal operation. At step 202, the light passing through the primary apertures is spread apart by at least a factor of two times a baseline separation of the primary apertures. The light is spread into a non-redundant array of secondary apertures. At step 203, the light from the secondary apertures is focused at a detector, and an image of the target is detected at the detector with the focused light.

Decision 204 checks an operating mode of the homodyne encoder system. During the calibration cycle, process 200 proceeds to step 205, and during the normal operation, process 200 proceeds to step 206.

At step 205 during the calibration cycle, the path lengths are calibrated within the homodyne encoder system with the predetermined light source, which is disposed sufficiently near the primary apertures to ensure an absence of atmospheric distortion. The calibration includes, in response to an interference pattern within the image of the predetermined light source at the detector, modifying the path lengths so that the path lengths of the light are matched from the predetermined light source through each of the primary apertures to the detector. Process 200 then returns to step 201 for subsequent normal operation at steps 206, 207, and 208.

At step 206 during the normal operation, a wavefront shape is determined for the light as received from the external target. The wavefront shape specifies an atmospheric distortion between the external target and the homodyne encoder system. Step 206 includes determining the wavefront shape from an interference pattern within the image of the external target.

At step 207 during the normal operation, in response to the wavefront shape of the light as received from the external target, the atmospheric distortion between the external target and the homodyne encoder system is compensated to enhance the image of the external target.

At step 208 during the normal operation, the path lengths from the most recent calibration at step 205 are modified to compensate for effects of measured environmental conditions on the homodyne encoder system, so that the path lengths of the light remain matched through each of the primary apertures to the detector. Process 200 then returns to step 201 either for recalibration or for further normal operation.

The calibration cycle is repeated as needed with the actuators dynamically modifying and matching the path lengths within the homodyne encoder system. In various embodiments of the invention, the calibration cycle at step 205 is repeated periodically, in response to observed deterioration of the image of the target, and/or when the determined distortion corrections are inconsistent with atmospheric models.

Furthermore, between calibration cycles, step 208 compensates for the effects of the measured variation of environmental conditions on the homodyne encoder system. In one example, components of the homodyne encoder system deform during changes of temperature, changes of temperate gradients across the homodyne encoder system, linear and rotational acceleration forces, and wind pressure dependent upon atmospheric density and velocity of the homodyne encoder system relative to the wind. With measurement of the environmental conditions and advance characterization of the effects of such deforming changes on the homodyne encoder system, the actuators modify the path lengths at step 208 to compensate for these effects, so that the path lengths of the light remain matched through each of the primary apertures to the detector without recalibration.

Figure 3:
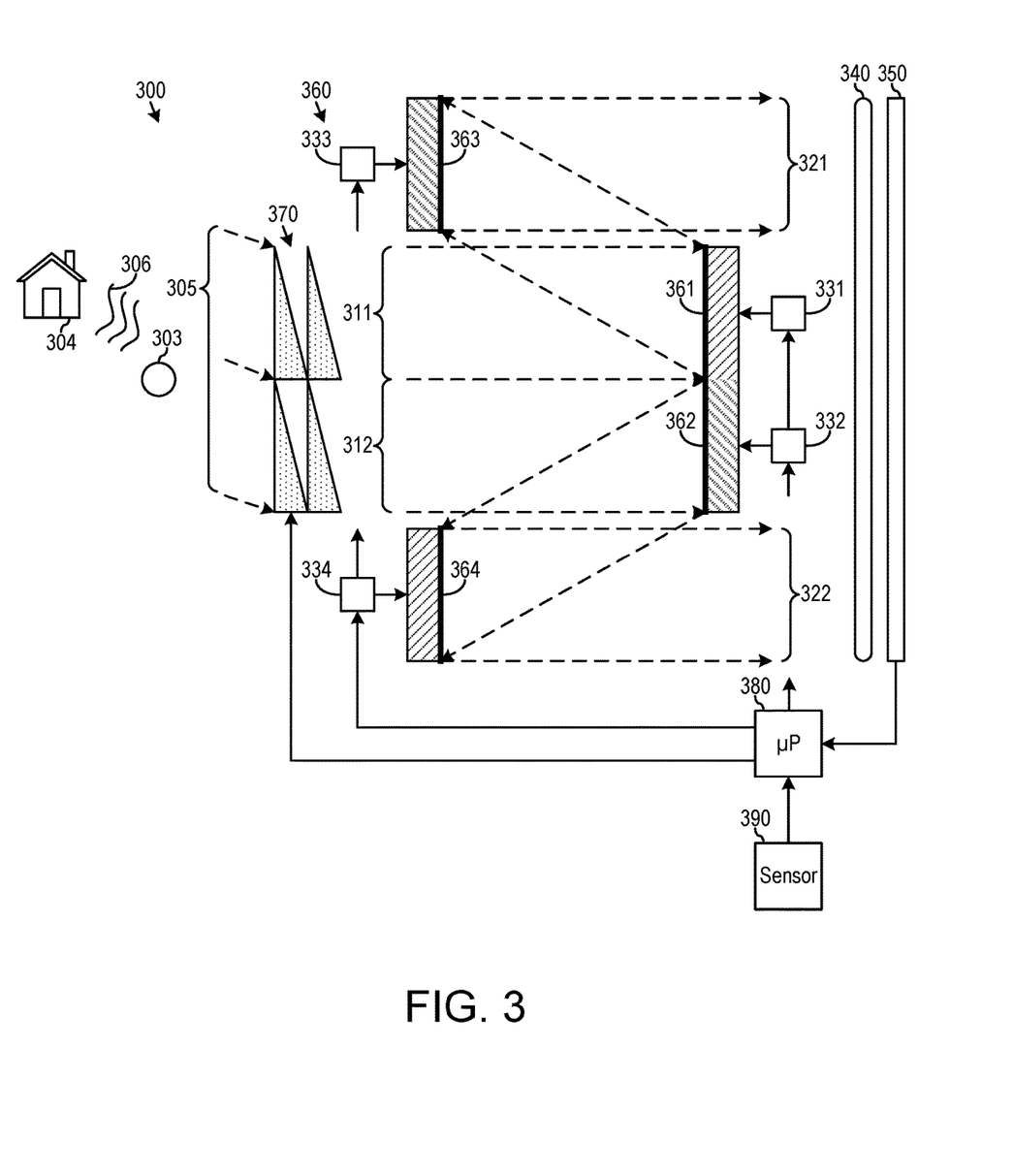
FIG. 3 is a cross-sectional block diagram of a homodyne encoder system with adaptive matching of path lengths through reflecting diffractive optical elements driven with transducers in accordance with an embodiment of the invention.

FIG. 3 is a cross-sectional block diagram of a homodyne encoder system 300 with adaptive matching of path lengths through primary apertures 311 and 312 and through reflecting diffractive optical elements 361, 362, 363, and 364 driven with respective transducers 331, 332, 333, and 334 in accordance with an embodiment of the invention. For discussion clarity, only two primary apertures 311 and 312 are shown.

The homodyne encoder system 300 includes primary apertures 311 and 312 for receiving light from a target, which is light source 303 during a calibration cycle and an external target 304 during normal operation. Note the external target 304 is not a part of the homodyne encoder system 300, but the light source 303 is part of the homodyne encoder system 300 in certain embodiments of the invention. An optical spreader 360 includes the reflecting diffractive optical elements 361, 362, 363, and 364 that spread apart the light passing through the primary apertures 311 and 312 by at least a factor of two times a baseline separation of the primary apertures 311 and 312. The optical spreader 360 further includes actuator transducers 331, 332, 333, and 334, such a piezoelectric transducers, for modifying the path lengths within the homodyne encoder system 300 through the primary apertures 311 and 312 to a detector 350. The focusing optic 340 focuses the light from the secondary apertures 321 and 322 at the detector 350. The focusing optic 340 generates an image of the target 303 or 304 at the detector 350.

In the embodiment of FIG. 3, the homodyne encoder system 300 includes inner and outer sets of the prisms 370. The prisms 370 receive the light from the target 303 or 304 before the light reaches the primary apertures 311 and 312. The prisms 370 redirect a field of view 305 to the target 303 or 304. The prisms 370 are shown aligned in FIG. 3 to provide a maximum possible deflection of the field of view 305. The prisms 370 are rotated together as a unit to rotate this maximum possible deflection toward in any direction around the rotational axis. When the inner and outer sets of prisms 370 are rotated relative to each other about this axis, the amount of deflection continuously varies between none and the maximum possible deflection.

Although the prisms 370 provide flexible redirection of the field of view 305 through a variety of angular orientations, the prisms introduce path-length differences depending upon the angular orientation of the field of view 305. The path-length differences are at a maximum when the prisms 370 are aligned to provide the maximum possible deflection as shown in FIG. 3. The maximum path-length differences usually exceed the coherence length of the light from the target 303 or 304, so that the interference pattern disappears in the image of the target 303 or 304 at detector 350. Therefore, embodiments of the invention configure the actuator transducers 331, 332, 333, and 334 to modify the path lengths to compensate for the angular orientation of the field of view 305 of the homodyne encoder system 300.

The reflecting diffractive optical element 361 diffracts the light from the primary aperture 311 at a dispersion angle that depends linearly upon the wavelength of the light. At a designed center wavelength, the reflecting diffractive optical element 361 diffracts the light so that the entire surface of the next diffractive optical element 363 is illuminated with the light diffracted from the reflecting diffractive optical element 361. For wavelengths significantly shorter or significantly longer than the designed center wavelength, none of the diffracted light of these wavelengths reaches the next diffractive optical element 363 due to the dispersion. Thus, the optical spreader 360 implements a narrow bandwidth filter. The reflecting diffractive optical element 363 is typically identical to reflecting diffractive optical element 361, so that their dispersions cancel. Thus, when the light entering the primary aperture 311 is parallel rays in a wide bandwidth from a distant target 304, then the spread light exiting the secondary aperture 321 is parallel rays in a narrow bandwidth. The reflecting diffractive optical elements 362 and 364 similarly spread a narrow bandwidth of the light from the primary aperture 312 to the secondary aperture 322.

Typically, the homodyne encoder system 300 is dynamically calibrated. During each calibration cycle, a known light source 303 becomes the target. In response to the image of the light source 303 at the detector 350, the actuator transducers 331, 332, 333, and 334 are configured to modify the path lengths during the calibration cycle so that the path lengths of the light are matched from the light source 303 through each of the primary apertures 311 and 312 to the detector 350.

In one embodiment, the light source 303 is a point light source disposed sufficiently near the primary apertures 311 and 312 to ensure the absence of atmospheric distortion 306 in the light reaching the primary apertures 311 and 312 from the light source 303. If the light source 303 is also centered on a symmetry axis of the homodyne encoder system 300, then the wavefront shape of the light as received from the light source 303 becomes a spherical wavefront shape centered across the primary apertures 311 and 312. However, the prisms 370 and/or misalignment within the homodyne encoder system 300 introduce instrument distortion, so that the wavefront received at the detector 350 deviates from the expected spherical wavefront shape.

In one embodiment, the deviating wavefront shape is not calculated during calibration. Instead, the instrument distortion is determined from the interference pattern within the image of the light source 303 at the detector 350. An expected interference pattern is predetermined that includes sets of superimposed fringes, with each set of fringes corresponding to a pairing of the primary apertures including the primary apertures 311 and 312. Thus, in a symmetrical embodiment with three primary apertures, three sets of fringes are expected each oriented at a multiple of 120 degrees with the fringes spaced apart by a pitch given by the distance between the light source 303 and the homodyne encoder system 300. A tip and/or tilt distortion is indicated when the three sets of fringes converge away from the center of detector 350 and/or have a spacing different from the expected spacing. A piston distortion is indicated when the fringes converge at different phases, for example, the set of fringes for one aperture pairing is bright at the convergence, while the other sets of fringes are dark at the convergence.

In another embodiment, the deviating wavefront shape is calculated during calibration, and the piston, the tilt, and the tip of the instrument distortion is determined by comparing the deviating wavefront shape with the expected spherical wavefront shape.

During the calibration cycle, processing circuit 380 is adapted to determine and correct the instrument distortion from the image of the known light source 303 detected at the detector 350. Such instrument distortion includes optical alignment drift caused by thermal cycling. During the normal operation, processing circuit 380 is adapted to determine the atmospheric distortion 306 between the external target 304 and the homodyne encoder system 300 from the image of the external target 304 detected at the detector 350, and to compensate for the atmospheric distortion 306 to enhance the image of the external target 304. The processing circuit 380 is a programmed microprocessor or a configured field programmable gate array (FPGA) in various embodiments of the invention.

During a calibration cycle that does not determine the deviating wavefront shape, processing circuit 380 calculates a Fourier transform in two dimensions from the image of the known light source 303 detected at the detector 350. Typically, the processing circuit 380 calculates a fast Fourier transform (FFT). Because the focusing optic 340 itself typically implements a Fourier transform, the Fourier transform calculated in processing circuit 380 gives the spatial frequencies of the light across the secondary apertures 321 and 322. Because the optical spreader 360 spreads apart the light passing through the primary apertures 311 and 312 by at least the factor of two into a non-redundant array of the secondary apertures 321 and 322, the respective interference pattern for every pairing of the primary apertures has distinct spatial frequencies across the calculated two-dimensional Fourier transform. Thus, the processing circuit 380 readily separates, from the calculated Fourier transform, the distinct spatial frequencies of the respective interference pattern for each pairing of the primary apertures, which include primary apertures 311 and 312. To complete the calibration, the processing circuit 380 configures the actuator transducers 331, 332, 333, and 334 to modify the path lengths until the distinct spatial frequencies of the respective interference pattern for each pairing of the primary apertures matches the corresponding spatial frequencies of the predetermined interference pattern expected when the path lengths of the light are matched from the light source 303 through each of the primary apertures 311 and 312 to the detector 350.

During a calibration cycle that does determine the deviating wavefront shape, after the processing circuit 380 calculates a Fourier transform in two dimensions from the image of the known light source 303 and separates, from the calculated Fourier transform, the distinct spatial frequencies of the respective interference pattern for each pairing of the primary apertures, the processing circuit 380 then calculates an inverse Fourier transform into the two dimensions from the distinct spatial frequencies separated for each pairing of the primary apertures. Each inverse Fourier transform specifies a projection of the deviating wavefront shape of the light as received from the light source 303, the projection along an axis through the pairing of the primary apertures. The processing circuit 380 determines the entire deviating wavefront shape of the light as received from the light source 303 across the two dimensions collectively from the projection for every pairing of the primary apertures. To complete the calibration, the processing circuit 380 configures the actuator transducers 331, 332, 333, and 334 to modify a piston, a tilt, and tip of the path lengths until the wavefront shape of the light as received from the light source 303 becomes the expected wavefront shape. In a symmetrical embodiment, the processing circuit 380 configures the actuator transducers 331, 332, 333, and 334 to modify a piston, a tilt, and tip of the path lengths until the wavefront shape becomes the expected spherical wavefront shape, with the spherical wavefront shape having a radius matching a distance between the light source 303 and the homodyne encoder system 300 so that the path lengths of the light are optically equal from the light source 303 through each of the primary apertures 311 and 312 to the detector 350.

The above discussion assumes a point light source 303 centered on a symmetry axis of the homodyne encoder system 300. However, this is not required. The light source 303 for calibration is a point incoherent light source, a point partially coherent light source, a point coherent light source, an incoherent light source with predetermined spatial extent, a partially coherent light source with predetermined spatial extent, a coherent light source with predetermined spatial extent, or an predetermined object with spatial extent that is illuminated with known illumination. The light source 303 appears anywhere within the field of view 305 due to instrument distortion and/or redirection of the field of view 305 by prisms 370. All that is required is that the light source 303 is known and disposed at a known distance so that the expected interference pattern and/or the expected wavefront shape are calculable.

After the calibration cycle, the target becomes the generally unknown external target 304 during the normal operation. Because the calibration has eliminated the instrument distortion within the homodyne encoder system 300, any distortion measured for the external target 304 is atmospheric distortion 306. The processing circuit 380 calculates a Fourier transform in two dimensions from the image of the external target 304 at the detector 350. The processing circuit 380 separates, from the Fourier transform, the distinct spatial frequencies of the respective interference pattern for each pairing of the primary apertures 311 and 312, and calculates an inverse Fourier transform into the two dimensions from the distinct spatial frequencies separated for each pairing of the primary apertures 311 and 312. The inverse Fourier transform specifies a projection of a wavefront shape of the light as received from the external target 304, the projection along an axis through the pairing of the primary apertures 311 and 312. The processing circuit 380 determines the wavefront shape of the light as received from the external target 304 across the two dimensions collectively from the projection for every pairing of the primary apertures 311 and 312. The wavefront shape specifies the atmospheric distortion 306 between the external target 304 and the homodyne encoder system 300. Finally, the processing circuit 380 compensates for the atmospheric distortion 306 and enhances the image of the external target 304 in response to the wavefront shape of the light as received from the external target 304.

Sensor 390 measures environmental conditions, such as temperature, velocity, acceleration, and an angular orientation of a field of view 305 of the homodyne encoder system 300 after the calibration cycle during the normal operation. The processing circuit 380 configures the actuator transducers 331, 332, 333, and 334 to modify the path lengths to compensate for effects of the measured environmental conditions on the homodyne encoder system 300 so that the path lengths of the light remain matched through each of the primary apertures 311 and 312 to the detector 350. Thus, sensor 390 helps compensate for environmental conditions, off-axis viewing angles, and mechanical effects caused by platform movement, sensor movement, and targeting movement. Sensor 390 helps dynamically maintain matched path lengths within the homodyne encoder system 300 without recalibration. However, the processing circuit 380 can start another calibration cycle in response to observed deterioration of the image of the external target 304.

Figure 4:
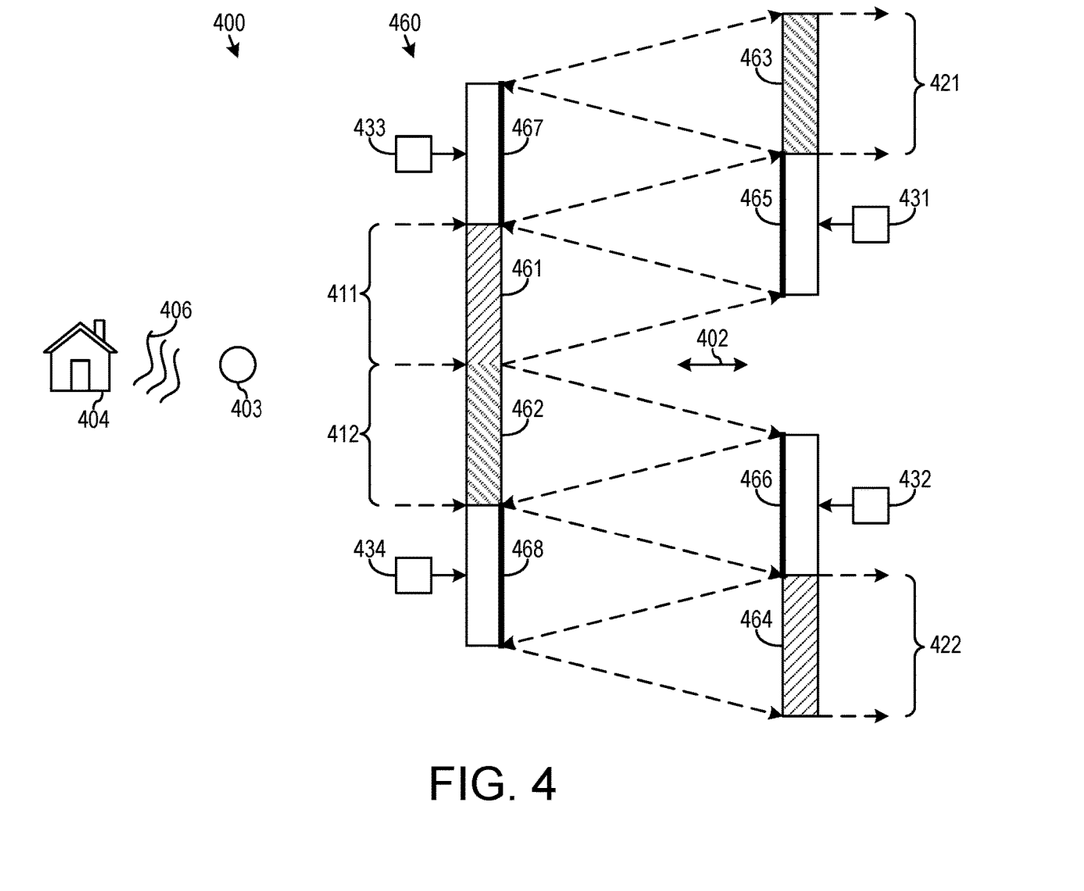
FIG. 4 is a cross-sectional block diagram of a homodyne encoder system with adaptive matching of path lengths through transmitting diffractive optical elements and transducer-driven mirrors in accordance with an embodiment of the invention.

FIG. 4 is a cross-sectional block diagram of a homodyne encoder system 400 with adaptive matching of path lengths through transmitting diffractive optical elements 461, 462, 463, and 464 and through transducer-driven folding mirrors 465, 466, 467, and 468 in accordance with an embodiment of the invention. The focusing optic and the detector included in the homodyne encoder system 400 are not shown in FIG. 4.

An optical spreader 460 includes a first set of transmitting diffractive optical elements 461 and 462 and a second set of transmitting diffractive optical elements 463 and 464 for transposing the light passing through each of the primary apertures 411 and 412 radially away from a symmetry axis 402 by at least the factor of two times a baseline separation between the primary apertures 411 and 412. The light is transposed into a non-redundant array of secondary apertures 421 and 422. For each of the primary apertures 411 and 412 a respective diffractive optical element 461 or 462 in the first set diffracts the light away from the symmetry axis 402, and subsequently a respective diffractive optical element 463 or 464 in the second set equally diffracts the light back towards to the symmetry axis 402 and into the secondary apertures 421 and 422. The transmitting diffractive optical elements 461 and 462 in the first set introduce dispersion that is canceled with the transmitting diffractive optical elements 463 and 464 in the second set. Due to the dispersion, the secondary apertures 421 and 422 transmit a narrow bandwidth of the light received at the primary apertures 411 and 412.

Actuator transducers 431, 432, 433, and 434, such as piezoelectric transducers, drive respective folding mirrors 465, 466, 467, and 468. In one example, the path length from primary aperture 412 to secondary aperture 422 is determined to be longer on average than the path length from primary aperture 411 to secondary aperture 421. This piston distortion is corrected by actuator transducers 432 and 434 moving folding mirrors 466 and 468 towards each other and/or actuator transducers 431 and 433 moving folding mirrors 465 and 467 away from each other. For tip and tilt distortions, actuator transducers 431, 432, 433, and 434 appropriately tip and tilt the folding mirrors 465, 466, 467, and 468 to counteract the tip and tilt distortions.

The path lengths through the primary apertures 411 and 412 are matched using an image of the known light source 403 during a calibration cycle. During normal operation, the atmospheric distortion 406 between the external target 404 and the homodyne encoder system 400 is determined from the image of the external target 404, and the image of the external target 404 is enhanced upon compensating for the atmospheric distortion 406.

FIG. 4 shows the secondary apertures 421 and 422 spread the light by a factor of 2.5 times the width of each of the primary apertures 411 and 412 due to constraints on the outward spreading of the light path. This is more than the minimum needed spreading factor of two. However, the minimum spreading factor is achievable upon relaxing these constraints to include both radial and circumferential spreading.

Figure 5:
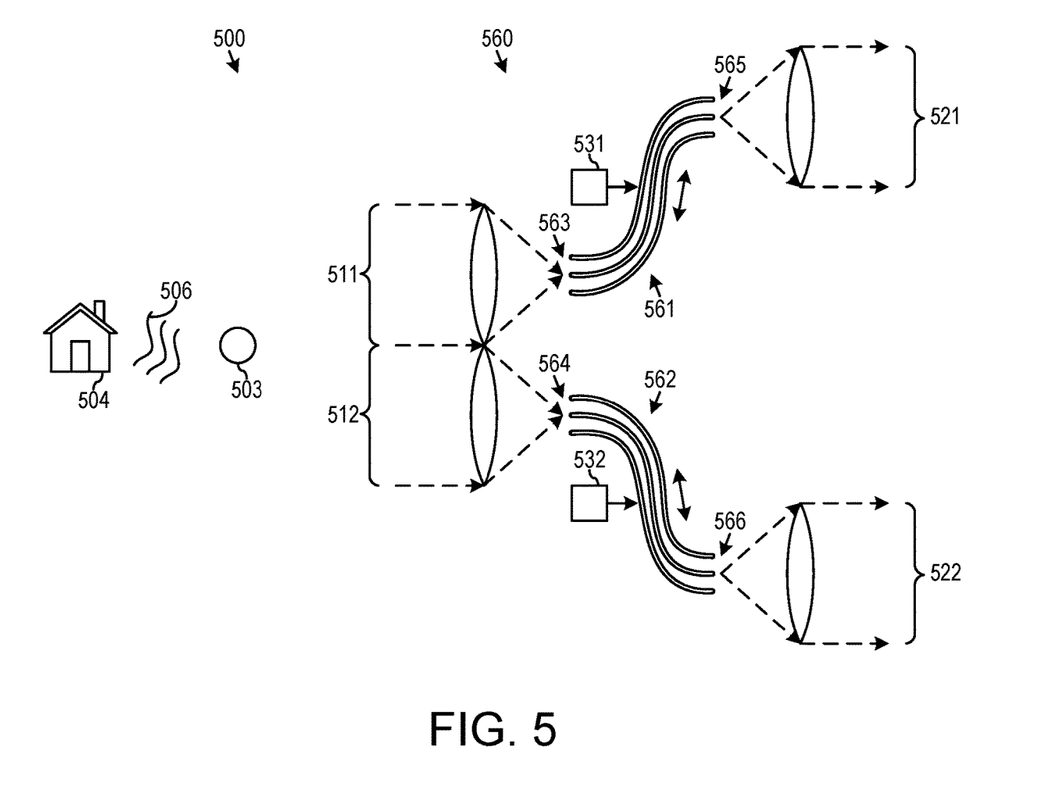
FIG. 5 is a cross-sectional block diagram of a homodyne encoder system with adaptive matching of path lengths through transducer-driven optical fibers in accordance with an embodiment of the invention.

FIG. 5 is a cross-sectional block diagram of a homodyne encoder system 500 with adaptive matching of path lengths through transducer-driven optical fibers 561 and 562 in accordance with an embodiment of the invention. The optical fibers 561 and 562 have entrance apertures 563 and 564 at the primary apertures 511 and 512 and have exit apertures 565 and 566 at the secondary apertures 521 and 522. The focusing optic and the detector included in the homodyne encoder system 500 are not shown in FIG. 5.

An optical spreader 560 includes the optical fibers 561 and 562 for transposing the light passing through each of the entrance apertures 563 and 564 by at least the factor of two times a baseline separation, which is a distance between the pairing of the entrance apertures 563 and 564. Exit apertures 565 and 566 of the optical fibers 561 and 562 are transposed radially away from the entrance apertures 563 and 564 by at least the factor of two into a non-redundant array. The actuators 531 and 532 of the optical spreader 560 stretch a length of the optical fibers 561 and 562 between the entrance apertures 563 and 564 and the exit apertures 565 and 566. Uniform stretching of the optical fibers 561 and 562 corrects piston distortion, and a stretching gradient across the optical fibers 561 and 562 corrects tip and tilt distortions.

The path lengths through the primary apertures 511 and 512 are matched using an image of the known light source 503 during a calibration cycle. During normal operation, the atmospheric distortion 506 between the external target 504 and the homodyne encoder system 500 is determined from the image of the external target 504, and the image of the external target 504 is enhanced upon compensating for the atmospheric distortion 506.

From the above description of Homodyne Encoder System with Adaptive Path Length Matching, it is manifest that various techniques may be used for implementing the concepts of systems 100, 300, 400, and 500 and method 200 without departing from the scope of the claims. The described embodiments are to be considered in all respects as illustrative and not restrictive. The method/apparatus disclosed herein may be practiced in the absence of any element that is not specifically claimed and/or disclosed herein. It should also be understood that each of systems 100, 300, 400, or 500 or method 200 is not limited to the particular embodiments described herein, but is capable of many embodiments without departing from the scope of the claims.

I claim:

1. A homodyne encoder system with adaptive matching of path lengths, comprising:
   a plurality of primary apertures for receiving light from a target;
   an optical spreader for spreading apart the light passing through the primary apertures by at least a factor of two times a baseline separation of the primary apertures, wherein the optical spreader includes a plurality of actuators for modifying the path lengths within the homodyne encoder system through the primary apertures to a detector;
   a focusing optic for focusing the light from the optical spreader at the detector; and
   the detector for detecting an image of the target with the light from the focusing optic.

2. The homodyne encoder system of claim 1, wherein the actuators are configured to modify the path lengths so that the path lengths of the light are matched through each of the primary apertures to the detector.

3. The homodyne encoder system of claim 2, further comprising:
   a light source that becomes the target during a calibration cycle,
   wherein, in response to the image of the light source at the detector, the actuators are configured to modify the path lengths during the calibration cycle so that the path lengths of the light are matched from the light source through each of the primary apertures to the detector.

4. The homodyne encoder system of claim 3, wherein the light source is selected from the group consisting of a point incoherent light source, a point partially coherent light source, a point coherent light source, an incoherent light source with predetermined spatial extent, a partially coherent light source with predetermined spatial extent, a coherent light source with predetermined spatial extent, and an illuminated predetermined object with spatial extent.

5. The homodyne encoder system of claim 3, further comprising:
   a set of prisms for receiving the light from the target before reaching the primary apertures and for redirecting a field of view to the target, the prisms introducing path-length differences depending upon an angular orientation of the field of view,
   wherein, in response to the angular orientation of the field of view after the calibration cycle, the actuators are configured to modify the path lengths to compensate for the path-length differences after the calibration cycle so that the path lengths of the light remain matched through each of the primary apertures to the detector.

6. The homodyne encoder system of claim 1, wherein:
   the path lengths are matched when, for every pairing of two of the plurality of primary apertures and in an absence of atmospheric distortion between the target and the homodyne encoder system, the light passing through the pairing of the primary apertures has optically equal path lengths from a respective point of the target to a corresponding point in the image of the target at the detector, the respective point for the pairing of the primary apertures imaged into the corresponding point in the image; and the actuators are configured to modify the path lengths so that, in the absence of the atmospheric distortion, the path lengths of the light are optically equal from the respective point of the target for each pairing of the primary apertures through the pairing of the primary apertures to the corresponding point in the image of the target at the detector.

7. The homodyne encoder system of claim 6, further comprising:
  a light source that becomes the target during a calibration cycle, the light source disposed sufficiently near the primary apertures to ensure the absence of the atmospheric distortion,
  wherein, in response to the image of the light source at the detector, the actuators are configured to modify a piston, a tilt, and tip of the path lengths during the calibration cycle so that the path lengths of the light are optically equal from the light source through each of the primary apertures to the detector.

8. The homodyne encoder system of claim 1, further comprising:
  at least one processing circuit adapted to calculate a Fourier transform in two dimensions from the image of the target,
  wherein because the optical spreader spreads apart the light passing through the primary apertures by at least the factor of two into a non-redundant array of a plurality of secondary apertures, for every pairing of two of the plurality of primary apertures, a respective interference pattern between the light passing through the pairing of the primary apertures has distinct spatial frequencies across the two dimensions of the Fourier transform.

9. The homodyne encoder system of claim 8, wherein the respective interference pattern for each pairing of the primary apertures occurs when the path lengths are matched and even when the light received from the target is incoherent light.

10. The homodyne encoder system of claim 8, further comprising:
  a light source that becomes the target during a calibration cycle,
  wherein the at least one processing circuit is further adapted during the calibration cycle to:
    separate, from the Fourier transform, the distinct spatial frequencies of the respective interference pattern for each pairing of the primary apertures; and
    configure the actuators to modify the path lengths until the distinct spatial frequencies of the respective interference pattern for each pairing of the primary apertures matches corresponding spatial frequencies of a predetermined interference pattern expected when the path lengths of the light are matched from the light source through each of the primary apertures to the detector.

11. The homodyne encoder system of claim 10, wherein the at least one processing circuit is further adapted, after the calibration cycle during a normal operation when the target is an external target, to:
  separate, from the Fourier transform, the distinct spatial frequencies of the respective interference pattern for each pairing of the primary apertures;
  calculate an inverse Fourier transform into the two dimensions from the distinct spatial frequencies separated for each pairing of the primary apertures, the inverse Fourier transform specifying a projection of a wavefront shape of the light as received from the external target, the projection along an axis through the pairing of the primary apertures; and
  determine the wavefront shape of the light as received from the external target across the two dimensions collectively from the projection for every pairing of the primary apertures, the wavefront shape specifying an atmospheric distortion between the external target and the homodyne encoder system.

12. The homodyne encoder system of claim 11, wherein the at least one processing circuit is further adapted during the normal operation to:
  compensate for the atmospheric distortion and enhance the image of the external target in response to the wavefront shape of the light as received from the external target.

13. The homodyne encoder system of claim 8, wherein the at least one processing circuit is further adapted to:
  separate, from the Fourier transform, the distinct spatial frequencies of the respective interference pattern for each pairing of the primary apertures;
  calculate an inverse Fourier transform into the two dimensions from the distinct spatial frequencies separated for each pairing of the primary apertures, the inverse Fourier transform specifying a projection of a wavefront shape of the light as received from the target, the projection along an axis through the pairing of the primary apertures; and
  determine the wavefront shape of the light as received from the target across the two dimensions collectively from the projection for every pairing of the primary apertures.

14. The homodyne encoder system of claim 13, further comprising:
  a light source that becomes the target during a calibration cycle,
  wherein the at least one processing circuit is further adapted during the calibration cycle to configure the actuators to modify a piston, a tilt, and tip of the path lengths until the wavefront shape of the light as received from the light source becomes a spherical wavefront shape, with the spherical wavefront shape having a radius matching a distance between the light source and the homodyne encoder system so that the path lengths of the light are matched from the light source through each of the primary apertures to the detector.

15. The homodyne encoder system of claim 14, wherein the at least one processing circuit is further adapted, after the calibration cycle during a normal operation when the target is an external target, to:
  compensate for an atmospheric distortion between the external target and the homodyne encoder system and enhance the image of the external target in response to the wavefront shape of the light as received from the external target.

16. The homodyne encoder system of claim 15, wherein, in response to measured environmental conditions including temperature, velocity, acceleration, and an angular orientation of a field of view of the homodyne encoder system after the calibration cycle during the normal operation, the actuators are configured to modify the path lengths to compensate for effects of the measured environmental conditions on the homodyne encoder system so that the path lengths of the light remain matched through each of the primary apertures to the detector.

17. The homodyne encoder system of claim 1, wherein:
the plurality of primary apertures is three circular apertures surrounding a symmetry axis through the homodyne encoder system;
the optical spreader includes a first and second set of diffractive optical elements for transposing the light passing through each of the three circular apertures radially away from the symmetry axis by at least the factor of two times the baseline separation, which equals a diameter of each of the three circular apertures, the light transposed into a non-redundant array of a plurality of secondary apertures, wherein for each of the three circular apertures a respective diffractive optical element in the first set diffracts the light away from the symmetry axis and subsequently a respective diffractive optical element in the second set equally diffracts the light back towards to the symmetry axis and into the secondary apertures;
the actuators of the optical spreader are selected from a group consisting of liquid crystal layers inserting a variable phase delay along the path lengths within the homodyne encoder system, piezoelectric transducers driving the diffractive optical elements that are reflective diffractive optical elements in the first and second sets, and piezoelectric transducers driving folding mirrors along the path lengths within the homodyne encoder system;
the focusing optic is a lens for focusing the light from the optical spreader at the detector; and
the detector is a pixelated detector for detecting the image, which is a two-dimensional image of the target, with the light from the lens.

18. The homodyne encoder system of claim 1, wherein:
the plurality of primary apertures is entrance apertures of a plurality of optical fibers;
the optical spreader includes the optical fibers for transposing the light passing through each of the entrance apertures by at least the factor of two times the baseline separation, which is a distance between each pairing of the entrance apertures, wherein exit apertures of the optical fibers are transposed radially away from the entrance apertures by at least the factor of two into a non-redundant array;
the actuators of the optical spreader are actuators that stretch a length of the optical fibers between the entrance and exit apertures;
the focusing optic is a lens for focusing the light from the optical spreader at the detector; and
the detector is a pixelated detector for detecting the image, which is a two-dimensional image of the target, with the light from the lens.

19. A method for adaptive matching of the path lengths within the homodyne encoder system of claim 1, comprising:
receiving the light from the target at the primary apertures of the homodyne encoder system, wherein the target is a predetermined light source during a calibration cycle and is an external target during a normal operation;
spreading apart the light passing through the primary apertures by at least the factor of two times the baseline separation of the primary apertures, the light spread into a non-redundant array of a plurality of secondary apertures;
focusing the light from the secondary apertures at the detector;
detecting the image of the target at the detector with the light from the focusing;
during the calibration cycle, calibrating the path lengths within the homodyne encoder system with the predetermined light source, the predetermined light source disposed sufficiently near the primary apertures to ensure an absence of atmospheric distortion, wherein the calibrating includes, in response to an interference pattern within the image of the predetermined light source, modifying the path lengths so that the path lengths of the light are matched from the predetermined light source through each of the primary apertures to the detector;
during the normal operation, determining a wavefront shape of the light as received from the external target, the wavefront shape specifying an atmospheric distortion between the external target and the homodyne encoder system, wherein the determining includes determining the wavefront shape from an interference pattern within the image of the external target;
during the normal operation, in response to the wavefront shape of the light as received from the external target, compensating for the atmospheric distortion between the external target and the homodyne encoder system to enhance the image of the external target; and
during the normal operation, modifying the path lengths from the calibrating to compensate for effects of measured environmental conditions on the homodyne encoder system so that the path lengths of the light remain matched through each of the primary apertures to the detector.

20. A method for adaptive matching of path lengths within a homodyne encoder system, comprising:
receiving light from a target at a plurality of primary apertures of the homodyne encoder system, wherein the target is a predetermined light source during a calibration cycle and is an external target during a normal operation;
spreading apart the light passing through the primary apertures by at least a factor of two times a baseline separation of the primary apertures, the light spread into a non-redundant array of a plurality of secondary apertures;
focusing the light from the secondary apertures at a detector;
detecting an image of the target at the detector with the light from the focusing;
during the calibration cycle, calibrating the path lengths within the homodyne encoder system with the predetermined light source, the predetermined light source disposed sufficiently near the primary apertures to ensure an absence of atmospheric distortion, wherein the calibrating includes, in response to an interference pattern within the image of the predetermined light source, modifying the path lengths so that the path lengths of the light are matched from the predetermined light source through each of the primary apertures to the detector;
during the normal operation, determining a wavefront shape of the light as received from the external target, the wavefront shape specifying an atmospheric distortion between the external target and the homodyne encoder system, wherein the determining includes determining the wavefront shape from an interference pattern within the image of the external target;
during the normal operation, in response to the wavefront shape of the light as received from the external target, compensating for the atmospheric distortion between the external target and the homodyne encoder system to enhance the image of the external target; and during the normal operation, modifying the path lengths from the calibrating to compensate for effects of measured environmental conditions on the homodyne encoder system so that the path lengths of the light remain matched through each of the primary apertures to the detector.

\* \* \* \* \*